(12) United States Patent
Takao

(10) Patent No.: US 8,377,837 B2
(45) Date of Patent: Feb. 19, 2013

(54) WEAR RESISTANT MEMBER, WEAR RESISTANT DEVICE AND METHOD FOR MANUFACTURING THE WEAR RESISTANT MEMBER

(75) Inventor: Minoru Takao, Yokohama (JP)

(73) Assignees: Kabushiki Kaisha Toshiba, Tokyo (JP); Toshiba Materials Co., Ltd., Yokohama-Shi (JP)

( * ) Notice: Subject to any disclaimer, the term of this patent is extended or adjusted under 35 U.S.C. 154(b) by 179 days.

(21) Appl. No.: 12/988,386

(22) PCT Filed: Apr. 9, 2009

(86) PCT No.: PCT/JP2009/057277
§ 371 (c)(1),
(2), (4) Date: Oct. 18, 2010

(87) PCT Pub. No.: WO2009/128386
PCT Pub. Date: Oct. 22, 2009

(65) Prior Publication Data
US 2011/0039068 A1  Feb. 17, 2011

(30) Foreign Application Priority Data

Apr. 18, 2008 (JP) ................. 2008-109366

(51) Int. Cl.
*C04B 35/587* (2006.01)
(52) U.S. Cl. .... 501/97.2; 501/97.3; 384/492; 384/907.1
(58) Field of Classification Search ............ 501/97.1, 501/97.2, 97.3, 97.4; 384/492, 907.1
See application file for complete search history.

(56) References Cited

U.S. PATENT DOCUMENTS
(Continued)

FOREIGN PATENT DOCUMENTS
DE  101 36 499 A1  2/2003
EP  0 742 183 A2  11/1996
(Continued)

OTHER PUBLICATIONS

International Search Report issued Jun. 2, 2009 in PCT/JP09/57277 filed Apr. 9, 2009.

(Continued)

*Primary Examiner* — Karl Group
(74) *Attorney, Agent, or Firm* — Oblon, Spivak, McClelland, Maier & Neustadt, L.L.P.

(57) ABSTRACT

A wear resistant member formed of silicon nitride sintered body having a volume of 4000 mm$^3$ or more, the silicon nitride sintered body containing 1 to 5 mass % of a rare earth component in terms of rare earth element, 1 to 6 mass % of an Al component in terms of Al element, 10 to 3500 ppm of an Fe component in terms of Fe element, and 10 to 1000 ppm of a Ca component in terms of Ca element, wherein a β-phase ratio of silicon nitride crystal grains is 95% or more, a maximum longer diameter of the silicon nitride crystal grains is 40 μm or less, and each of dispersions in Vickers hardness and fracture toughness of an inner portion of the wear resistant member is within a range of ±10%. According to this structure, the wear resistant member can be manufactured with a low cost, and there can be provided a wear resistant member comprising a silicon nitride sintered body excellent in reliability and the dispersion in characteristics is effectively suppressed.

14 Claims, 2 Drawing Sheets

THRUST TYPE ROLLING WEAR TESTING APPARATUS

U.S. PATENT DOCUMENTS

| | | | |
|---|---|---|---|
| 5,525,134 A | 6/1996 | Mehrotra et al. | |
| 7,192,899 B2 * | 3/2007 | Komatsu | 501/97.2 |
| 7,521,388 B2 * | 4/2009 | Komatsu et al. | 501/97.2 |
| 2002/0006859 A1 * | 1/2002 | Wotting et al. | 501/97.1 |
| 2002/0136908 A1 | 9/2002 | Komatsu et al. | |
| 2006/0128552 A1 * | 6/2006 | Komatsu | 501/97.2 |

FOREIGN PATENT DOCUMENTS

| | | | |
|---|---|---|---|
| EP | 1 669 335 A1 | | 6/2006 |
| JP | 64 14176 | | 1/1989 |
| JP | 4 187566 | | 7/1992 |
| JP | 5 170547 | | 7/1993 |
| JP | 2002 326875 | | 11/2002 |
| JP | 2006 290709 | | 10/2006 |
| WO | 2005030674 | * | 4/2005 |
| WO | 2008 032427 | | 3/2008 |

OTHER PUBLICATIONS

International Preliminary Report on Patentability and Written Opinion issued Nov. 30, 2010 in PCT /JP2009/057277 filed Apr. 9, 2009.

Xue-Tao Luo, et al., "Preparation and Toughening Characterization of High Fracture Toughness $Si_3N_4$ Ceramic with Rodlike Structure", Journal of Materials Science Letters, XP002655143, vol. 16, No. 13, Jul. 1, 1997, pp. 1216-1218.

Longjie Zhou, et al., "Preparation of $Si_3N_4$ Ceramics with High Strength and High Reliability via a Processing Strategy", Journal of the European Ceramic Society, XP004346246, vol. 22, No. 8, Aug. 1, 2002, pp. 1347-1355.

Supplemental Search Report issued Aug. 17, 2011, in European Patent application No. 09732082.4-2111/2266935.

* cited by examiner

THRUST TYPE ROLLING WEAR TESTING APPARATUS

WEAR RESISTANT MEMBER, WEAR RESISTANT DEVICE AND METHOD FOR MANUFACTURING THE WEAR RESISTANT MEMBER

TECHNICAL FIELD

The present invention relates to a wear (abrasion) resistant member, a wear resistant device and a method for manufacturing the member, and more particularly to a wear resistant member comprising a ceramic sintered body mainly formed of silicon nitride, a wear resistant device using the wear resistant member and a method for manufacturing the wear resistant member.

BACKGROUND ART

A ceramic sintered body has properties of light weight, high hardness, high wear resistance, high anti-corrosion resistance and low thermal expansion coefficient, so that the ceramic sintered body has been widely used as a member for constituting precious devices. In particular, from the viewpoint of excellence in high hardness and the wear resistance, the ceramic sintered body has been preferably utilized as the wear resistant member constituting a bearing. Among various ceramic sintered bodies, a silicon nitride ($Si_3N_4$) sintered body has a high hardness and an excellent wear resistance, so that the silicon nitride sintered body has been preferably used as a member for constituting the bearings or the like.

Regarding this silicon nitride sintered body, for the purpose of improving a reliability as the wear resistant member for constituting the bearings or the like, further improvements in properties have been advanced in these days. For example, there has been proposed a method of manufacturing the silicon nitride sintered body, comprising the steps of:

preparing a material powder mixture by adding yttrium oxide, spinel, aluminum oxide and/or aluminum nitride to a silicon nitride material powder at predetermined molar ratio of specified metal elements and predetermined content ratio;

preparing a compact body (molded body) formed from the material powder mixture;

sintering the compact body at a temperature of 1400 to 1500° C.;

further sintering the compact body at a temperature of 1500 to 1650° C. in a nitrogen gas atmosphere of 10 atm or higher thereby to obtain a sintered body having a relative density of about 98%; and conducting a secondary sintering operation to the sintered body at a temperature of 1400 to 1650° C. thereby to increase the relative density to be over 98%, so that there can be manufactured a silicon nitride sintered body excellent in strength and having less scattering in strength properties (for example, refer to Patent Document 1).

Further, as the silicon nitride raw material powder used for manufacturing this type of the silicon nitride sintered body, it is generally known that a high-purity material powder is preferably used. for example, a high purity material powder synthesized through an imido thermal decomposition method has been suitably used.

However, this high-purity material powder is costly expensive, and mechanical strength and fracture toughness values of the manufactured silicon nitride sintered body are tend to become excessively large, so that there is posed a problem such that a workability of the resultant sintered body is not sufficient.

In order to solve this problem, there has been reviewed a method of manufacturing the silicon nitride sintered body by using a cheap silicon nitride raw material powder manufactured through a direct nitriding method in which a metal Si is directly nitrided. The silicon nitride raw material powder manufactured through the direct nitriding method has relatively large Fe and Ca contents.

However, it is know that when the contents of the rare earth element, aluminum component and silicon carbide or the like are controlled to be within predetermined ranges, so that there can be obtained a sintered body having a mechanical strength, a wear resistance and a rolling life property that are equal to or more than those of conventional sintered bodies, and the resultant sintered body is also excellent in workability (for example, refer to Patent Document 2).

Further, there has been reviewed a method for suppressing the sintered body from generating defects by lowering a total oxygen content at peripheral portion of the sintered body whereby a depth of the defects such as pore and crack can become shallow, and a generation of failure due to these defects can be effectively suppressed (for example, refer to Patent Document 3).

Patent Document 1: Japanese Patent Application (Publication) No. 06-080470 (Examples or the Like)
Patent Document 2: International Patent Application (Publication) No. 2005/030674
Patent Document 3: Japanese Patent Application (Publication) No. 2002-326875

DISCLOSURE OF THE INVENTION

As described above, when the compact (molded body) formed of the material powder mixture containing the silicon nitride raw material powder is subjected to a primary sintering, a sintered body having a relative density of about 98% is obtained. Thereafter, the resultant sintered body is further subjected to a secondary sintering operation in a nitrogen gas atmosphere having a pressure of 10 atm or higher so as to obtain a sintered body having a relative density of over 98%; preferably 99% or higher, thereby to manufacture a silicon nitride sintered body excellent in strength and having a less scattering in strength properties. However, in order to obtain the relative density of about 98% at the primary sintering operation, it is necessary to strictly control the manufacturing process, so that there is posed a problem such that a production cost required for manufacturing the silicon nitride sintered body is disadvantageously increased.

As described above, the cost of the silicon nitride material powder manufactured through the direct nitriding method is relatively low. Further, when amounts of rare earth element, aluminum component and silicon carbide or the like contained in the silicon nitride material powder are controlled to be within predetermined ranges, there can be manufactured a silicon nitride sintered body excellent in mechanical strength, wear resistance and rolling life property or the like, especially excellent in workability.

However, thus manufactured silicon nitride sintered bodies exhibit a dispersion in its characteristics, so that when the these silicon nitride sintered bodies are used as wear resistant members under a more severe condition, there has been posed a problem that there may be some sintered bodies having insufficient characteristics. Further, since there is the dispersion in characteristics as described above, some sintered bodies are liable to be damaged during a working process or the like when the sintered bodies are worked to be wear resistant members, so that there has been posed a serious problem of lowering a production yield at the manufacturing process.

The present invention had been achieved to address the problems described above. Accordingly, an object of the present invention is to provide a wear (abrasion) resistant member comprising a silicon nitride sintered body capable of being manufactured with a low cost and also capable of suppressing the dispersion in characteristics. Another object of the present invention is to provide a wear resistant device using the wear resistant member and a method of manufacturing the wear resistant member.

In order to achieve the aforementioned objects, the present invention provides a wear resistant member formed of silicon nitride sintered body having a volume of 4000 mm³ or more, the silicon nitride sintered body containing 1 to 5 mass % of a rare earth component in terms of rare earth element, 1 to 6 mass % of an Al component in terms of Al element, 10 to 3500 ppm of an Fe component in terms of Fe element and 10 to 1000 ppm of a Ca component in terms of Ca element, wherein a 8-phase ratio of silicon nitride crystal grains is 95% or more, a maximum longer diameter of the silicon nitride crystal grains is 40 µm or less, and each of dispersions in Vickers hardness and fracture toughness of an inner portion of the wear resistant member is within a range of ±10%.

Further, the wear resistant member according to the present invention preferably has excellent characteristics such that the inner portion of the wear resistant member has a Vickers hardness of 1380 or more and a fracture toughness of 5.5 MPa·m$^{1/2}$ or more.

In this connection, the term "inner portion" of the wear resistant member formed of silicon nitride sintered body means five portions shown in FIG. 2A and FIG. 2B. Namely, in a cross section passing through a center portion C1 of the wear resistant members 2 and 8, when a straight line is drawn from the center portion C1 to an outer edge of the wear resistant members 2 and 8, four intermediate portions (C2-C5) between the respective outer edges and the center portion C1 are specified. Therefore, the "five portions" (C1-C5) means the four intermediate portions (C2-C5) and the center portion (C1) as a total. Vickers hardness and fracture toughness are measured at these five portions, and the dispersion thereof shall be calculated.

Measuring of a longer diameter of the silicon nitride crystal grain is performed in accordance with the following manner. Namely, a photograph of a unit area of 200 µm×200 µm in a cross section of a structure of the silicon nitride sintered body is taken. Then, a longer diameter of the largest silicon nitride crystal grain observed on the photograph is defined as a "maximum longer diameter" at the cross sectional portion. This measuring operation is repeated at 3 portions that are arbitrarily selected in one cross sectional area. These values measured at 3 portions are averaged, and the resulting averaged value is defined as a "maximum longer diameter".

Further, the β-phase ratio of above the silicon nitride crystal grain is identified by mean of an X-ray diffraction (XRD) apparatus.

Further, in the above wear resistant member, it is preferable that the silicon nitride sintered body has a porosity of 1% or less, and a maximum diameter of void is 3 µm or less. In case of a densified sintered body having the porosity of 1% or less, a structural strength of the sintered body is high and durability thereof is also excellent. Furthermore, when the maximum diameter of void is 3 µm or less, such voids hardly become a starting point of a fracture of the silicon nitride sintered body, so that a life span of the wear resistant member can be prolonged.

Furthermore, in the above wear resistant member, it is preferable that an aggregation (segregation) diameter of a grain boundary phase component in the silicon nitride sintered body is 20 µm or less. When the size of the brittle aggregation of the grain boundary phase component is 20 µm or less, a structural strength of the wear resistant member can be increased.

In this connection, the above "diameter of void" and "aggregation diameter of the grain boundary phase component" are evaluated by: arbitrarily selecting a unit area of 200 µm×200 µm from a cross section of the wear resistant member to be observed, taking an enlarged photograph of the unit area by means of SEM or the like, and drawing a circumscribed circle for circumscribing the void or the aggregated portion of the grain boundary phase component. A diameter of the circumscribed circle is defined as "the diameter of void" or "the aggregation diameter of the grain boundary phase component".

Still further, in the above wear resistant member, it is also preferable that the silicon nitride sintered body has a number ratio of 5% or more, when the number ratio is defined as a ratio of a number of columnar crystal grains each having grown to form a longitudinal diameter of 3 µm or more with respect to a whole number of crystal grains constituting the silicon nitride sintered body. When the number ratio of the columnar crystal grains each having grown to form a longitudinal diameter of 3 µm or more with respect to a whole number of crystal grains is 5% or more, there can be obtained a high toughness structure in which columnar crystal grains are formed in a complicated manner and complicatedly entangled to each other.

The ratio of the columnar crystal grains each having grown is evaluated by selecting a unit area of 200 µm×200 µm from a crystal structure of the wear resistant member to be observed, taking an enlarged photograph of the unit area, counting a number of the silicon nitride crystal grains imaginary observed on the enlarged photograph, and calculating the ratio of the columnar crystal grains in accordance with a calculation formula (1) hereunder.

Ratio of the columnar crystal grains=(the number of the silicon nitride columnar crystal grains each having a longitudinal diameter of 3µm or more/a whole number of silicon nitride crystal grains)× 100%     (1)

Further, in the above wear resistant member, it is also preferable that the wear resistant member has a surface roughness (Ra) of 0.5 µm or less. When the surface roughness (Ra) is 0.5 µm or less, defective portions functioning as a starting point of fracture can be almost eliminated, so that there can be obtained a wear resistant member excellent in durability.

Even in a case where the wear resistant member of the present invention is subjected to a grinding work so as to have a surface roughness (Ra) of 0.5 µm or less, preferably 0.05 µm or less, the wear resistant member hardly generate the defective portions such as breaking, fracture, crack, chap or the like. Therefore, a production yield during manufacturing and working the wear resistant member is extremely favorable.

Further, in the above wear resistant member, it is also preferable that the silicon nitride sintered body has a double-ball crush strength (paired-balls crush strength) of 100 N/mm² or more. In a case where the double ball crush strength of the wear resistant member formed of the silicon nitride sintered body having the spherical shape is 100 N/mm² or more, the wear resistant member can exhibit an excellent durability as a bearing rolling body for heavy load use.

In this regard, the "double-ball crush strength" of the spherical wear resistant member is measured by using a raw-spherical body strength testing apparatus shown in FIG. 3. Namely, the spherical wear resistant members 8 and 8 as testing spherical bodies are arranged in series between jigs 10 and 10. In this state, a load P is applied to the spherical wear resistant members 8 and 8 at a crosshead speed of 3 mm/min or less, and the spherical wear resistant members 8 and 8 are held in a pressurized state for 10 seconds, thereafter, the load P is removed. Therefore, the double-ball crush strength can be calculated from a maximum load at which the testing spherical bodies would not cause a crack. Among the two testing spherical bodies subjected to the strength test, one testing spherical body is used for measuring the aforementioned Vickers hardness and fracture toughness.

In the above wear resistant member, it is necessary that a maximum longer diameter of the silicon nitride crystal grain constituting the wear resistant member is 40 μm or less.

Further, in the above wear resistant member, it is also preferable that an average aspect ratio, which is defined as an average value of respective aspect ratios of silicon nitride crystal grains, is 2 or more. When the average aspect ratio is 2 or more, the wear resistant member having an excellent wear resistance can be obtained. In this connection, an upper limit of the above aspect ratio is preferably 10 or less.

The wear resistant member may be, for example, a wear resistant member having an almost plate-shape. Such the plate-shaped wear resistant member is attached to a rolling wear testing apparatus shown in FIG. 1. Three SUJ2 rolling steel balls having a diameter of 9.35 mm are placed on a track having a diameter of 40 mm disposed on a top surface of the plate-shaped wear resistant member formed of the silicon nitride sintered body. When these rolling steel balls are rotated at 1200 rpm under a condition that a load is applied so as to apply a maximum contact stress of 5.9 GPa to the rolling balls, it is preferable that the rolling life, which is defined by the number of rotations that have been occurred by the time the plate-shaped wear resistant member is exfoliated, is preferably at least $2\times10^7$.

Further, the wear resistant member may also be, for example, a wear resistant member having a spherical shape. It is preferable that such the spherical wear resistant member has a diameter of 20 mm or more. In case of a large spherical wear resistant member (volume of 4187 mm$^3$ or more) having a diameter of 20 mm or more, the durability as a wear resistant member is particularly excellent.

Further, the aforementioned wear resistant member is subjected to a grinding work, thereby to form spherical bodies each having a diameter of 9.35 mm. Then, such the spherical bodies are attached to the rolling wear testing apparatus shown in FIG. 1. When three spherical wear resistant members (rolling balls) each having a diameter of 9.35 mm are placed on a track having a diameter of 40 mm disposed on the top surface of an SUJ2 steel plate and are rotated at 1200 rpm under a condition that a load is applied so as to apply a maximum contact stress of 5.9 GPa to the rolling balls, it is preferable that the rolling life, which is defined by the elapsed time until the sintered silicon nitride rolling balls are exfoliated, is preferably at least 100 hours.

A wear resistant device according to the present invention is a wear resistant device comprising a plurality of the wear resistant members and these wear resistant members are the wear resistant member of the present invention.

The present invention provides a method of manufacturing a wear resistant member formed of silicon nitride sintered body having a volume of 4000 mm$^3$ or more, the method comprising:

a material powder mixture preparing step in which a silicon nitride material powder containing 10 to 3500 ppm of an Fe component in terms of Fe element and 10 to 1000 ppm of a Ca component in terms of Ca element is mixed with 1 to 5 mass % of a rare earth component in terms of rare earth element and 1 to 6 mass % of an Al component in terms of Al element as sintering agent powders; thereby to prepare the material powder mixture;

a molded body preparing step in which the material powder mixture is molded thereby to form the molded body (compact);

a primary sintered body preparing step in which the molded body is sintered at a sintering temperature of 1600 to 1950° C. wherein a heating rate (temperature rising rate) at a temperature range of 1400° C. to a maximum sintering temperature is controlled to be 20° C./hour or less, and a retention time for holding the molded body at the maximum sintering temperature is controlled to be 4 hours or more, thereby to obtain the primary sintered body having a relative density of 80 to 98%; and a secondary sintered body preparing step in which said primary sintered body is further sintered so that the relative density is increased to be 98% or more.

In the above method of manufacturing the wear resistant member, it is preferable that a lower limit of the heating rate at the temperature range of 1400° C. to the maximum sintering temperature is set to 5° C./hour or more. If the heating rate is set to less than 5° C./hour, a manufacturing management would become difficult. In particular, when the molded body is heated at a slow heating rate of 20° C./hour or less, it becomes possible for the large sintered body having a volume of 4000 mm$^3$ or more to effectively decrease voids to be formed in the sintered body.

In this connection, as a temperature rising profile (heating profile) for heating the molded body at the temperature range of 1400° C. to the maximum sintering temperature, there can be also adopted a temperature rising profile formed in multi-stepwisely increasing form. At any rate, as far as the average heating rate is 20° C./hour, the profile is sufficient.

Further, the retention time for holding the molded body at the maximum temperature is preferably set to a range of 4 to 10 hours in case of a sintered body having a volume range of 4000 to 7000 mm$^3$. While, in case of a sintered body having a volume exceeding 7000 mm$^3$, the retention time is preferably set to a range of 10 to 20 hours. Further, the heating rate for the sintered body is more preferably set to 10° C./hour or less. When the molded body is treated in accordance with the above retention time, a densification degree of the sintered body is improved and the voids can be reduced or completely eliminated.

Further, in the above method of manufacturing the wear resistant member, it is preferable that the secondary sintered body preparing step is performed by conducting a hot isostatic pressing (HIP) method to the primary sintered body under a condition that the primary sintered body is heated to a temperature of 80% to 100% of the maximum sintering temperature set in the primary sintered body preparing step. The hot isostatic pressing treatment to be performed at the above temperature range can effectively increase the densification degree of the resultant sintered body.

Furthermore, in the above method of manufacturing the wear resistant member, it is also preferable that the primary sintered body preparing step is performed under a condition that a heating time for heating the molded body from a temperature of 1400° C. to the maximum sintering temperature is controlled to be 10 hours or more. When the heating time is controlled to be 10 hours or more, an evaporation of impurity contents and a densification of void portions can be smoothly advanced.

Still further, in the above method of manufacturing the wear resistant member, it is also preferable that the method further comprises a grinding step in which the secondary sintered body is ground after the secondary sintered body preparing step so that a surface roughness (Ra) of the secondary sintered body is controlled to be 0.5 μm or less. When this grinding step is performed, it becomes possible to effectively remove defectives such as crack or breakage of the sintered body that functions as a starting point of the crack or the breakage. As a result, a defective percentage of products after completion of the grinding step can be reduced to be 1% or less.

According to the present invention, there can be provided a wear resistant member comprising ceramic sintered body mainly composed of silicon nitride in which 10 to 3500 ppm of Fe component and 10 to 1000 ppm of a Ca component are contained, dispersions in hardness and fracture toughness are suppressed to be within a range of ±10%, and the wear resistant member can be manufactured with a low cost and is excellent in reliability. Further, according to the present invention, when a wear resistant device is configured by using the wear resistant member, there can be provided the wear resistant device capable of being manufactured with a low cost and excellent in reliability.

Further, according to the present invention, a material powder mixture containing silicon nitride material powder, sintering agent (sintering promoter) powders, 10 to 3500 ppm of Fe component and 10 to 1000 ppm of Ca component is prepared. Then, the material powder mixture is molded to form a molded body. Thereafter, the molded body is primarily sintered to obtain the primary sintered body having a relative density of 80 to 98% and having a volume of 4000 mm$^3$ or more, and the primary sintered body is further sintered so that the relative density is increased to be 98% or more. As a result, there can be easily manufactured a wear resistant member in which 10 to 3500 ppm of Fe component and 10 to 1000 ppm of a Ca component are contained, dispersions in hardness and fracture toughness are suppressed to be within a range of ±10%.

BRIEF DESCRIPTION OF THE DRAWING

FIG. 2 is a cross-sectional view showing points at which Vickers hardness and fracture toughness of the wear resistant member are measured. FIG. 2A shows a case where the wear resistant member is spherical body, while

BEST MODE FOR CARRYING OUT THE INVENTION

Figure 1:
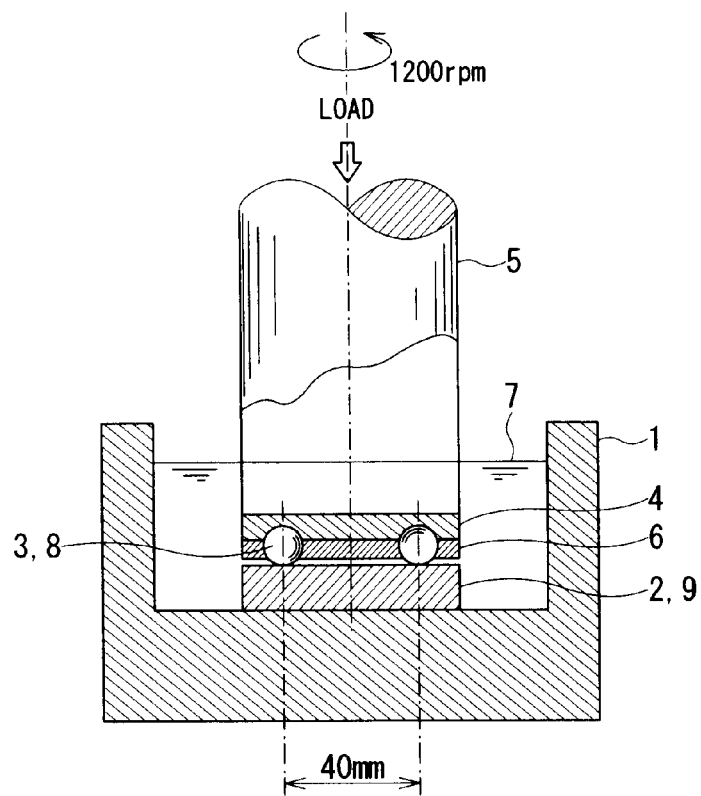
FIG. 1 is a cross-sectional view showing a structure of a thrust type rolling wear (abrasion) testing apparatus for measuring the rolling life characteristics of a wear (abrasion) resistant member according to the present invention.

Next, embodiments of the wear (abrasion) resistant member according to the present invention will be explained hereunder.

The present invention provides a wear resistant member mainly formed of silicon nitride sintered body having a volume of 4000 mm$^3$ or more, the wear resistant member contains 10 to 3500 ppm of an Fe component and 10 to 1000 ppm of a Ca component, wherein each of dispersions in Vickers hardness and fracture toughness of the wear resistant member is within a range of ±10%.

In a case where the contents of Fe component and Ca component in the wear resistant member exceed the above range, a brittle segregated portion functioning as a starting point of fracture is disadvantageously generated, so that characteristics such as hardness, fracture toughness or the like become to be easily lowered. Therefore, when the wear resistant member is subjected to a grinding work for manufacturing a wear resistant device or when the wear resistant member is actually used as the wear resistant member, exfoliation and crack are liable to occur.

On the other hand, in a case where the contents of Fe component and Ca component are less than the above range, it is necessary to use a silicon nitride material powder having a high purity for manufacturing the wear resistant member, so that material cost is drastically increased, thus being economically disadvantageous.

Namely, in the present invention, since the impurity contents such as Fe component and Ca component are controlled to be within the above range, it becomes possible to use an inexpensive silicon nitride raw powder containing relatively large amount of Fe component and Ca component as impurities. The inexpensive silicon nitride raw powder is manufactured through a direct nitriding method in which a metal Si is directly nitrided. The use of such raw material of low cost is very advantageous so as to reduce the manufacturing costs of the wear resistant member.

Further, in the present invention, in spite of the large amounts of Fe component and Ca component as impurities contained in the wear resistant member, the dispersions in hardness and fracture toughness are suppressed to be within a range of ±10%. Therefore, even in a case where the wear resistant members are used for a long period of time, a number of the wear resistant member causing the exfoliation or crack is few, so that there can be obtained a wear resistant member excellent in reliability.

The wear resistant member of the present invention has excellent characteristics such that a Vickers hardness (Hv) is 1380 or more and a fracture toughness is 5.5 MPa·m$^{1/2}$ or more. In this wear resistant member having a high Vickers hardness and a high fracture toughness, when a sintering time (temperature rising time and a retention time at the maximum sintering temperature) is set to 24 hours or more, the dispersions in characteristics can be effectively suppressed.

Further, even if the Vickers hardness (Hv) is set to 1380 or more and the fracture toughness is set to 5.5 MPa·m$^{1/2}$ or more, it is also possible to suppress the dispersions of the respective characteristics.

Figure 2A:
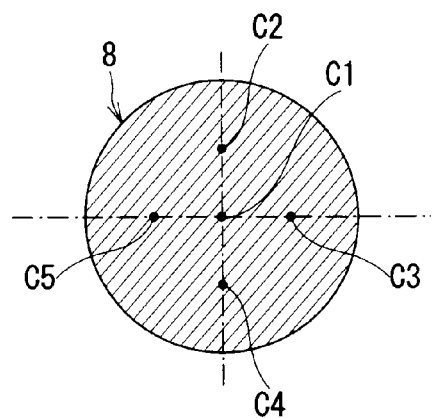
Figure 2B:
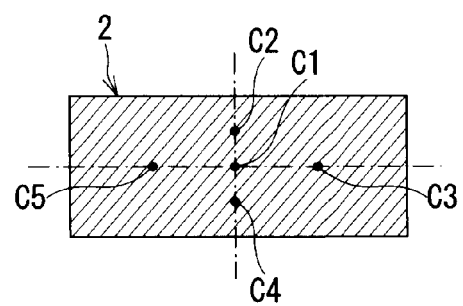
FIG. 2B shows a case where the wear resistant member has a rectangular shape in section.
Figure 3:
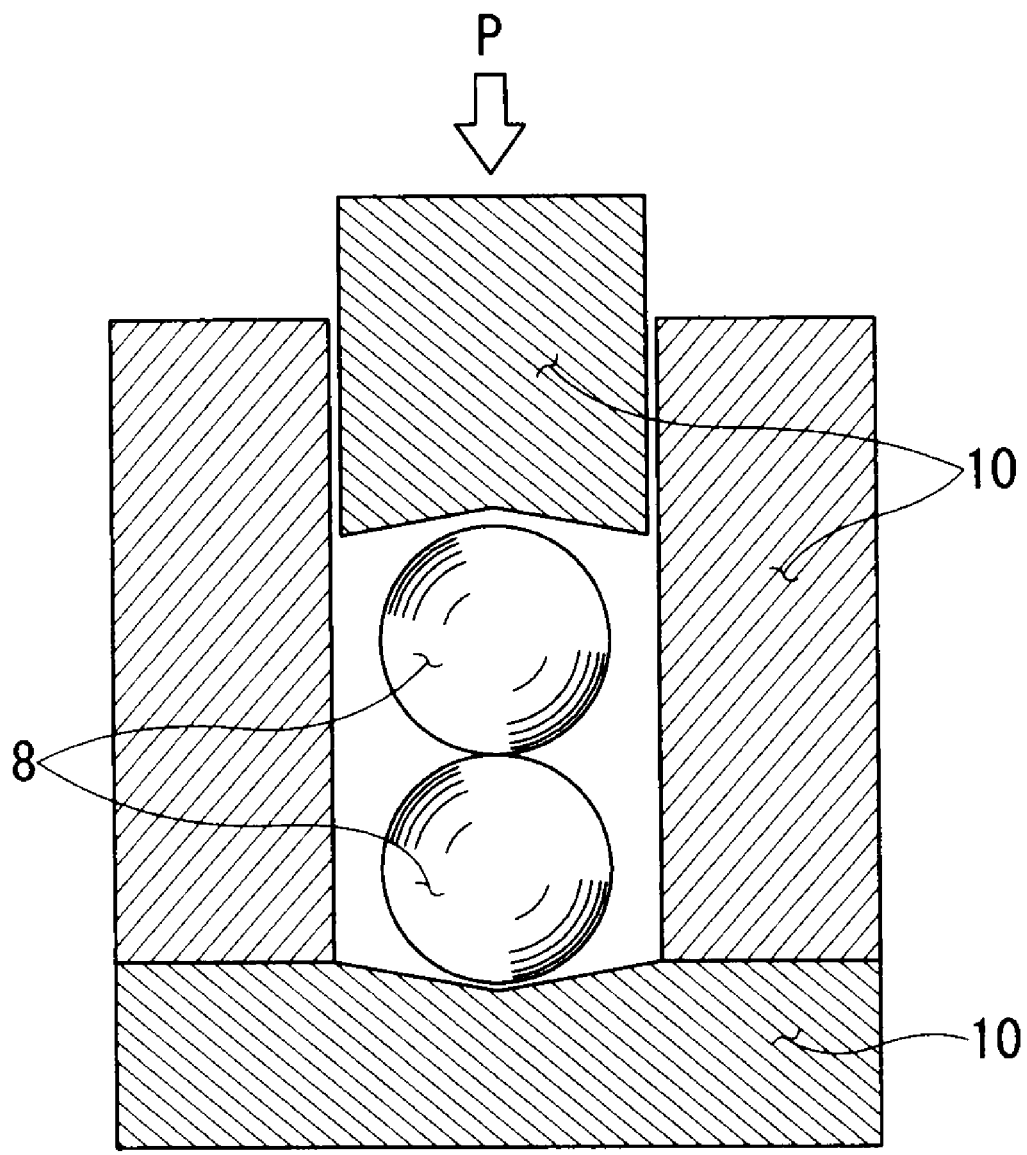
FIG. 3 is a cross sectional view showing a structure of a double-ball strength testing apparatus for measuring a crush strength of a spherical wear resistant member.

In this connection, the dispersion in the Vickers hardness (Hv) or the fracture toughness is calculated as the following manner. That is, at first, with respect to a plurality of wear resistant members manufactured under almost the same conditions such as material composition, manufacturing conditions or the like, the Vickers hardness (Hv) and the fracture toughness are measured at each of measuring points (C1 to C5) shown in FIG. 2, then averaging the measured values thereby to calculate an average value of Vickers hardness (Hv) and the fracture toughness. Among the measured values, a farthest value which is most numerically deviated from the average value (a farthest value which is most apart from the average value) is defined as a "most deviated value". Then, the measured average value and the most deviated value are put into a calculation formula (2) hereunder, thereby to calculate the respective dispersions.

Dispersion [%]=[(Average Value−Most Deviated Value)/Average Value]×100    (2)

In this regard, it is sufficient that the measuring for calculating the average value is performed with respect to only 10 pieces of the wear resistant members that are arbitrarily selected from a number of wear resistant members manufactured through almost the same conditions such as material composition, manufacturing conditions or the like.

Further, the Vickers hardness was measured in accordance with a method prescribed in Japan Industrial Standard (JIS R1610). In addition, the fracture toughness is measured by an IF method which is prescribed in Japan Industrial Standard (JIS R1607), thereby to calculate the fracture toughness on the basis of Niihara's equation.

The Niihara's equation is defined as follows:

$$\text{Fracture Toughness} = 0.0114 E^{0.4} P^{0.6} a^{-07} (C/a-1)^{-0.5}$$

wherein P denotes a load (kgf), E is Young's modulus, C denotes a crack length from a central point of the indentation (mm), and a is ½ of a diagonal line length (mm).

In the present invention, a longer diameter of silicon nitride crystal grain in the wear resistant member is required to be 40 μm or less. In other words, it is more preferable that a silicon nitride crystal grain having a longer diameter exceeding 40 μm are not existing in the wear resistant member. In a case where the coarse silicon nitride crystal grain having a longer diameter exceeding 40 μm are existing in the wear resistant member, the coarse silicon nitride crystal grain functions as a starting point of crack, so that the fracture toughness is greatly decreased, and a mechanical strength is also lowered, thus being not preferable indeed.

In this regard, the longer diameter of silicon nitride crystal grain is measured by the following manner. That is, the wear resistant member is cut and subjected to a mirror polishing the cut surface. Subsequently, the mirror-polished surface is subjected to an etching treatment there by to remove grain boundary component. Then, a unit area (100 μm×100 μm), which is arbitrarily selected from the etched surface, is taken a photograph by means of a scanning type electron microscope (SEM) at a magnification of ×5000 or more. The longer diameter of silicon nitride crystal grain is one observed on the photograph. Accordingly, a requirement of the present invention is achieved when the coarse silicon nitride crystal grain having a longer diameter exceeding 40 μm is not observed on the photograph of the wear resistant member.

Further, in the wear resistant member of the present invention, it is also preferable that an average aspect ratio, which is defined as an average value of respective aspect ratios of silicon nitride crystal grains, is 2 or more. In a case where the aspect ratio is less than 2, a micro-structure of the wear resistant member would not be a structure in which silicon nitride crystal grains are formed in a complicated manner and complicatedly entangled to each other, so that a mechanical strength or the like of the wear resistant member is liable to easily become insufficient.

In this regard, an aspect ratio (=longer diameter/shorter diameter) of the of silicon nitride crystal grain is obtained by the same aforementioned method used for observing the longer diameter of the silicon nitride crystal grain. Namely, the wear resistant member is cut and subjected to a mirror polishing the cut surface. Subsequently, the mirror-polished surface is subjected to an etching treatment there by to remove grain boundary component. Then, the unit area of surface is taken a photograph by means of a scanning type electron microscope (SEM). The longer diameter L and a shorter diameter S of a silicon nitride crystal grain observed on the photograph are measured. As a result, the aspect ratio is obtained as a ratio (US) of the longer diameter L to a shorter diameter S.

In addition, an average aspect ratio is obtained by averaging the respective aspect ratios of all the silicon nitride crystal grains observed in the unit area (100 μm×100 μm) revealed on the photograph. In this regard, it is preferable that an upper limit of the above average aspect ratio is 10 or less.

In a case where the wear resistant member of the present invention has an almost plate-shape, a surface to be tested is subjected to a mirror polishing work. Such the plate-shaped wear resistant member is attached to a rolling wear testing apparatus shown in FIG. 1. Three SUJ2 rolling steel balls having a diameter of 9.35 mm and having a surface state of Grade-5 or more are placed on a track having a diameter of 40 mm disposed on a top surface of the plate-shaped wear resistant member formed of the sintered silicon nitride. When these rolling steel balls are rotated at 1200 rpm under a condition that a load is applied so as to apply a maximum contact stress of 5.9 GPa to the rolling balls, it is preferable that the rolling life, which is defined by the number of rotations that have been occurred by the time the plate-shaped wear resistant member is exfoliated, is preferably at least $2 \times 10^7$.

The wear resistant member of the present invention has, for example, the rolling life of at least $2 \times 10^7$ as described above, so that the wear resistant member has a rolling life longer than that of conventional wear resistant member.

Other than the case where the wear resistant member is used as a plate-shaped member, the wear resistant member of the present invention is also used, for example, as a spherical bodies such as rolling ball (bearing ball) used in a bearing.

In a case where the wear resistant member is used as the rolling ball, an outer diameter of the rolling ball is not particularly limited. However, for example, a ball having the outer diameter of 20 mm or more is suitably used. Further, when the outer diameter of the ball is set to 25 mm or more, further, 30 mm or more, characteristics such a rolling life or the like can be remarkably increased in comparison with the conventional wear resistant member manufactured by a conventional method.

In addition, since the outer diameter is increased to be large, a difference in manufacturing cost (cost reduction) becomes more significant in comparison with those of the conventional rolling ball having a small diameter and is manufactured by using the expensive silicon nitride material powder synthesized through a conventional imide thermal decomposition method.

The wear resistant member having a volume of 4000 mm³ or more produced in the present invention is subjected to a grinding work, thereby to form spherical bodies each having a diameter of 9.35 mm. Then, such the spherical bodies are attached to the rolling wear testing apparatus shown in FIG. 1. When three spherical wear resistant members (rolling balls) each having a surface state of Grade −5 or more are placed on a track having a diameter of 40 mm disposed on the top surface of an SUJ2 steel plate of which testing surface is mirror-polished. Then, when the rolling balls are rotated at 1200 rpm under a condition that a load is applied so as to apply a maximum contact stress of 5.9 GPa to the rolling balls, it is preferable that the rolling life, which is defined by the elapsed time until the sintered silicon nitride rolling balls are exfoliated, is preferably at least 100 hours. The wear resistant member of the present invention has the above the rolling life of at least 100 hours which is longer than that of the conventional rolling balls.

These wear resistant members of the present invention can be used as not only the rolling balls constituting the bearing or the like but also used as structural members for various applications requiring wear (abrasion) resistance. Example of the various applications may include a cutting tool, a rolling jig, a valve check ball, engine parts, various jigs and tools, various rails, and various rollers.

A wear resistant device of the present invention comprises the above wear resistant member, particularly, comprises a plurality of the above wear resistant members according to the present invention.

Concretely, the wear resistant device of the present invention is, for example, a bearing using the wear resistant member as rolling balls, or a device comprising this bearing. In these wear resistant device, since the dispersions in hardness and fracture toughness of the wear resistant member are limited to be within the range of ±10%, a number of the wear resistant members causing damages such as exfoliation or crack or the like is few, so that a generation of vibration or the like can be suppressed for a long period of time, and the wear resistant member is excellent in reliability.

Further, according to the wear resistant device of this invention, it becomes possible to use aforementioned relatively inexpensive silicon nitride material powder containing large amounts of Fe component and Ca component, for constituting the wear resistant member, so that a cost of the wear resistant device can be lowered to be relatively inexpensive.

Next, a method of manufacturing the wear resistant member of the present invention will be explained hereunder.

The present invention provides a method of manufacturing a wear resistant member formed of ceramic sintered body mainly composed of silicon nitride, the method comprising the steps of:

preparing a material powder mixture containing silicon nitride material powder and sintering agent powder, 10 to 3500 ppm of an Fe component, 10 to 1000 ppm of a Ca component;

molding the material powder mixture thereby to form a molded body;

conducting a primary sintered body preparing step for sintering the molded body under the condition that the molded body is sintered at a sintering temperature of 1600 to 1950° C. wherein a heating rate for heating the molded body at a temperature range of 1400° C. to a maximum sintering temperature is controlled to be 20° C./hour or less, and a retention time for holding the molded body at the maximum sintering temperature is controlled to be 4 hours or more, namely a primary sintering step is performed for a total sintering time (temperature rising time+retention time at the maximum temperature) of 24 hours or more thereby to prepare a primary sintered body having a relative density of 80 to 98% and having a volume of 4000 mm$^3$ or more; and conducting a secondary sintered body preparing step in which the primary sintered body having a volume of 4000 mm$^3$ or more is further sintered so that the relative density is increased to be 98% or more.

When the above secondary sintering step is performed, inner pores and voids caused at the primary sintering step are buried and eliminated during the secondary sintering step, so that it becomes possible to eliminate the pores and voids existing at inner texture which cannot be detected from outside the wear resistant member.

Accordingly, even if the secondary sintered body is subjected to a grinding or polishing work to form a product surface, defectives such as pores (voids) generated at inner portions of the sintered body can be reduced, so that a percentage defective resulting from the pores and voids becomes to be 1% or less.

In comparison with a method using conventional primary and secondary sintering steps, the method of the present invention adopts the primary sintering step in which the relative density of a sintered body is controlled to be relatively low of 80 to 98%, and adopts the secondary sintering step (densifying sintering step) in which the relative density of the sintered body is further advanced to exceed 98%. When the above primary and secondary sintering steps are performed, even in a case where the amounts of Fe component and Ca component are relatively large in the material powder mixture, there can be easily manufactured a wear resistant member which is excellent in hardness and fracture toughness, and dispersions in hardness and fracture toughness are suppressed within a range of ±10%.

As a silicon nitride material powder used for manufacturing the wear resistant member, for example, a silicon nitride raw powder containing 10 to 3500 ppm of an Fe component and 10 to 1000 ppm of a Ca component is preferably used. As the silicon nitride material powder containing the Fe component and the Ca component of within the above range, for example, an inexpensive silicon nitride raw material powder manufactured by a metal nitriding method can be suitably adopted.

As the silicon nitride material powder, in consideration of the sintering characteristics, the bending strength, and the fracture toughness or the like, there can be preferably used the silicon nitride material powder containing at least 80% by mass, preferably 90% to 97% by mass of α-silicon nitride containing 1.5% by mass or less, preferably 0.9% to 1.2% by mass of oxygen and has an average particle diameter of 1.2 μm or less, preferably about 0.6 to about 1.0 μm.

In this regard, a silicon nitride raw material powder is known to have an α-phase type and a β-phase type. A silicon nitride sintered body made from the β-phasetype silicon nitride powder tends to have insufficient strength. In contrast, the α-phase type silicon nitride material powder can provide a high-strength sintered body having a high aspect ratio and containing highly entangled silicon nitride crystal grains.

Among the total amount of the α-phase type and the β-phase type silicon nitride material powder, when a blending ratio of the α-phase type silicon nitride material powder is controlled to be at least 80% by mass in the present inventive method, the bending strength, the fracture toughness, and the rolling life of the wear resistant member can be improved. On the other hand, in consideration of the sintering characteristics, the blending ratio of the α-phase type silicon nitride material powder is limited to 97% by mass or less. Preferably, the amount of the α-phase type silicon nitride material powder is 90% to 95% by mass.

By the way, after completion of the sintering step, the above α-phase type silicon nitride material powder is converted into β-phase type silicon nitride crystal grains in the sintered body in which the long β-phase type silicon nitride crystal grains are highly entangled. A β-phase ratio of these silicon nitride crystal grains is required to be 95% or more. When the β-phase ratio of the silicon nitride crystal grains is less than 95%, the bending strength and fracture toughness of the wear resistant member are lowered and a durability of the wear resistant member is deteriorated.

Further, as the silicon nitride material powder, in particular, use of a fine raw material powder having an average particle diameter of 0.8 μm or less can provide a densely sintered body having a porosity of 1% or less even using a smaller amount of sintering aid, thus being preferable. The porosity of this sintered body can easily be measured and determined according to Archimedes' principle.

The rare earth element is necessary to be added to the silicon nitride raw material powder as a sintering aid (sintering agent). As the rare earth element, it is preferable that at least one element selected from the group consisting of Y, Ho, Er, Yb, La, Sc, Pr, Ce, Nd, Dy, Sm and Gd or the like is added to the silicon nitride raw material powder. These rare earth elements react with the silicon nitride raw material powder to form a liquid phase, thus functioning as a sintering promoter (sintering agent).

It is preferable that an addition amount of the rare earth element is controlled to be 1 to 5 mass % with respect to an entire material powder mixture comprising the silicon nitride material powder and other sintering aids (hereinafter, referred to simply as "material powder mixture".

When the addition amount of the rare earth element is less than 1% by mass, the resultant wear resistant member has an insufficient density and strength. In particular, when the rare earth element has a high atomic weight as in a lanthanoid element, the wear resistant member will have a relatively low strength.

On the other hand, when the addition amount of the sintering aid is more than 4% by mass, an excessive amount of grain boundary phases are generated. This may increase the number of pores or decrease the strength of the wear resistant member.

Further, also an aluminum component is necessary to be added to the silicon nitride raw material powder. This aluminum component is necessary to be added as aluminum oxide ($Al_2O_3$) or aluminum nitride (AlN). Further, It is preferable that a total addition amount of these aluminum components is set within a range of 1 to 6 mass % in terms of Al element with respect to the entire material powder mixture.

The aluminum oxide ($Al_2O_3$) is added so as to enhance the function of the rare earth element as a sintering promoter, allows an increase in the density at low sintering temperature, control the grain growth in the crystal structure, and increase the mechanical strength, such as the bending strength and the fracture toughness or the like of a wear resistant member comprising a $Si_3N_4$ sintered body.

It is preferable that an addition amount of the aluminum oxide is controlled to within a range of 4 mass % or less with respect to the entire material powder mixture. When the addition amount of the aluminum oxide is more than 4 mass %, the oxygen content is increased in the sintered body. The increased oxygen content causes a non-uniform distribution of components in a grain boundary phase and decreases the rolling life of the wear resistant member.

In contrast, when the addition amount of the aluminum oxide ($Al_2O_3$) is less than 2 mass %, the resulting effects caused by adding $Al_2O_3$ is insufficient, so that it is preferable that the addition amount of the aluminum oxide is controlled to be 2 mass % or more. In view of the above viewpoint, the addition amount of the aluminum oxide ($Al_2O_3$) is more preferably set to a range of 2 mass % to 3.5% or less.

On the other hand, aluminum nitride (AlN) is added desirably at 3% by mass or less with respect to the entire material powder mixture so as to prevent or reduce the evaporation of a silicon nitride component during the sintering operation and enhance the function of the rare earth element as a sintering promoter. However, the addition amount of more than 3% by mass of AlN decreases the mechanical strength and the rolling life of the wear resistant member, thus being not preferable. In contrast, when the addition amount of the aluminum nitride (AlN) is less than 1 mass %, the above function caused by adding AlN is insufficient. Thus, the addition amount of AlN is controlled to be 1% by mass or more.

In this regard, the addition of both 2% to 4% by mass of $Al_2O_3$ and 1% to 3% by mass of AlN to the silicon nitride material powder can more effectively improve the mechanical characteristics of a wear resistant member. However, an excessive amount of $Al_2O_3$ and AlN decreases the rolling life of the wear (abrasion) resistant member. Thus, the total content of the aluminum components in the raw material powder mixture is preferably set to 6% by mass or less (oxide equivalent).

On the other hand, it is preferable that at least one compound selected from the group consisting of oxide, carbide, nitride, silicide, and boride of Ti, Hf, Zr, W, Mo, Ta, Nb, and Cr is added to the silicon nitride raw material powder. These compounds enhance the function of the rare earth oxide or the like as a sintering promoter, promotes the dispersion in the crystal structure, and improves the mechanical strength and the rolling life of the wear resistant member comprising a sintered silicon nitride. In particular, Ti, Mo, and Hf compounds are preferred.

When the addition amount of these compounds such as Ti or the like with respect to the entire material powder mixture is less than 0.1 mass % in terms of element thereof, the function caused by adding the compounds is insufficient. On the other hand, when the addition amount exceeds 5 mass %, the mechanical strength and the rolling life of the wear resistant member are decreased. Thus, the addition amount of the compound is limited to a range of 0.1 to 5% by mass. More desirably, the amount of the compound is particularly limited to a range of 0.5% to 2% by mass.

Further, silicon carbide (SiC) may be also added to the silicon nitride raw material powder. The silicon carbide (SiC) is dispersed as individual particles in a crystal structure and remarkably improves the rolling life of wear resistant member comprising the sintered silicon nitride.

When the addition amount of the silicon carbide with respect to the entire material powder mixture is less than 2 mass %, the effect caused by adding the silicon carbide is insufficient. On the other hand, when the addition amount exceeds 7 mass %, the sintered body results in an insufficient densification and decreases the bending strength of the wear resistant member. Thus, the amount of silicon carbide is limited to within a range of 2% to 7% by mass. By the way, silicon carbide can be divided into an α-type and a β-type, both of which exhibit the same operational effects, so that silicon carbide of either one of type can be added.

The wear resistant member according to the present invention is manufactured through, for example, the following processes. That is, a raw material powder mixture is prepared by adding predetermined amounts of required additives, such as a sintering aid comprising the rare earth element, aluminum component such as aluminum oxide ($Al_2O_3$) and/or aluminum nitride (AlN), and optional compound, such as Ti or the like, and silicon carbide, to a silicon nitride fine powder as described above. Further, an organic binder component is added to this raw material powder mixture thereby to prepare granulated powder.

At this time, an amount of an Fe component in terms of Fe element contained in the raw material powder mixture is set to within a range of 10 to 3500 ppm, and a Ca component in terms of Ca element is set to within a range of 10 to 1000 ppm. To set the amounts of the Fe component and the Ca component to within the above ranges can be achieved, for example, by adopting a silicon nitride material powder manufactured by a metal nitriding method in which the amounts of the Fe component and the Ca component are controlled to be within the predetermined ranges.

In this regard, normally, rare earth oxide, aluminum oxide, aluminum nitride, compounds of Ti or the like, sintering agent powders such as silicon carbide or the like do not contain the Fe component and the Ca component. Even in a case such materials contains the Fe component and/or the Ca component, the amounts thereof are very small. Therefore, the amounts of the Fe component and the Ca component can be controlled by the amounts of the Fe component and/or the Ca component contained in the silicon nitride material powder.

Then, thus obtained granulated powder is molded into a compact (molded body) having a predetermined shape. As a method of molding the granulated powder, a general-purpose molding-die pressing method and CIP (cold isostatic pressing) method or the like are suitably used.

In case of the formation of a compact (molded body) by the molding-die pressing method or the CIP molding method, the granulated powder is preferably molded at a pressure of 120 MPa or more to form a grain boundary phase in which pores and voids are hardly formed particularly after sintering operation.

When the molding pressure is less than 120 MPa, a cohesive portion (segregated portion) composed of a rare earth element compound, which principally forms a grain boundary phase, is easily formed. In addition, the resulting molded body has an insufficient density, and the wear resistant member easily includes a lot of cracks.

On the other hand, when the molding pressure exceeds 200 MPa, the durability of a molding die is decreased and is not always productive and productivity is disadvantageously decreased. Thus, the molding pressure is preferably set to a range from 120 to 200 MPa. Further, when the molding pressure exceeds 200 MPa, the resultant molded body becomes excessively hard, so that bubbles contained in inner portion are not easily escaped, and it becomes difficult to obtain a sintered body having a high density.

Subsequently, the molded body (molded compact) is heated at a temperature of 600° C. to 800° C. in a non-oxidizing atmosphere or at a temperature of 400° C. to 500° C. in the air for one to two hours to remove the organic binder sufficiently and degrease the molded body.

Then, the degreased molded body is subjected to a primary sintering step at normal pressure or high pressure in a non-oxidizing atmosphere of an inert gas such as a nitrogen gas or an argon gas for a sintering time (temperature rising time+ retention time at a maximum temperature) of 24 hours or more whereby a relative density of the resultant primary sintered body is controlled to be 80% or more and 98% or less.

Thereafter, the resultant primary sintered body is further subjected to a secondary sintering step in the non-oxidizing atmosphere so that the relative density of the resultant secondary sintered body is controlled to exceed 98%, thereby to form a silicon nitride sintered body (a wear resistant member). In this regard, the relative density of a sintered body is defined as a ratio (%) of an actual density measured on the basis of Archimedes' principle with respect to a theoretical density of the silicon nitride sintered body.

As a method of obtaining the theoretical density, the theoretical density, can be simply obtained by the following simplified method. For example, according to a Physical-Chemistry Dictionary or the like, there is described that a theoretical density of silicon nitride is 3.185 g/cm$^3$, that of yttrium oxide ($Y_2O_3$) is 5.03 g/cm$^3$, aluminum oxide ($Al_2O_3$) is 4.0 g/cm$^3$, magnesium oxide (MgO) is 3.58 g/cm$^3$. The theoretical density of the silicon nitride sintered body may be calculated in accordance with a mass ratio of the sintering promoters to be added, as follows.

Theoretical Density of Silicon Nitride Sintered Body=
(Mass of Silicon Nitride×Theoretical Density+
Mass of Yttrium Oxide×
Theoretical Density+ . . . )

For example, when assuming that the mass ratio of the respective components are 92 mass % of silicon nitride, 5 mass % of yttrium oxide and 3 mass % of aluminum oxide, a theoretical density of the silicon nitride sintered body having the above composition is calculated by the following calculation formula.

(Mass of Silicon Nitride:0.92×3.185+Mass of Yttrium Oxide:0.05×5.03+Mass of Aluminum Oxide: 0.03×4.0)=3.3017g/cm$^3$ As described above, according to the present invention, the molded body is sintered in the primary sintering step so as to obtain a relative density of 80 to 98% which is lower than that of the conventional manufacturing method. Thereafter, the sintered body is further sintered in the secondary sintering step so as to mainly increase the relative density of the sintered body. As a result, the dispersions in hardness and fracture toughness of the silicon nitride sintered body (wear resistant member) can be suppressed to within a range of ±10%. Even in a case where a volume of the sintered body after the primary sintering step is increased to be 4000 mm$^3$ or more, the hardness and fracture toughness are uniform over an entire sintered body, and there can be obtained a wear resistant member causing few crack formation and excellent in durability.

Further, there can be obtained excellent characteristics such that the a Vickers hardness is 1380 or more, and a fracture toughness of 5.5 MPa·m$^{1/2}$ or more, preferably, the Vickers hardness is 1430 or more, and the fracture toughness of 6.0 MPa·m$^{1/2}$ or more That is, when the relative density is set to less than 80% or larger than 98% in the primary sintering step, it becomes difficult to suppress the dispersions in Vickers hardness and the fracture toughness of the silicon nitride sintered body (wear resistant member) to be within a range of ±10% even if the relative density is set to larger than 98° A) in the secondary sintering step. When the dispersions in Vickers hardness and the fracture toughness of the wear resistant member to be within the range of ±10%, even in a case where the wear resistant member is formed to have a large size having a volume of 4000 mm$^3$ or more, there can be provided a wear resistant member having a uniform wear resistant property and excellent durability.

In the present invention, from viewpoints that the density of the silicon nitride sintered body is set to a high density at the completion of the aforementioned secondary sintering step; and the dispersions in Vickers hardness and the fracture toughness of the silicon nitride sintered body are suppressed to be within the range of ±10%, it is preferable that the density of the sintered body at the completion of the primary sintering step should be set to within a range of 80 to 98%.

In order to achieve the relative density of 80 to 98% of the sintered body having a volume of 4000 mm$^3$ or more after completion of the primary sintering step, the following ambient pressure sintering operation or pressure sintering operations should be performed. That is, for example, a temperature-rising rate (heating-up rate) for heating up the molded body is controlled to be 150° C./h or less, and the molded body is heated up to a maximum sintering temperature of 1700° C. to 1900° C., and a retention time for holding the molded body at the maximum sintering temperature is 2 to 10 hours.

More preferably, the temperature-rising rate is controlled to be the same as described above, and the molded body is heated up to a maximum sintering temperature of 1750° C. to 1825° C., and a retention time for holding the molded body at the maximum sintering temperature is 2 to 8 hours.

When the above maximum sintering temperature at the primary sintering step is lower than the lower limit of the above temperature range or when the retention time at the primary sintering step is less than the lower limit of the above time range, it becomes difficult to set the density of a primary sintered body to be 80% or more at a stage of completion of the primary sintering step.

Further, in a case where the maximum sintering temperature in the primary sintering step exceeds the upper limit of the above temperature range or where the sintering time in the primary sintering step exceeds the upper limit of the above time range, a sintering is excessively advanced at the primary sintering step, so that there may be a fear that the density of the resultant primary sintered body exceeds 98%.

Further, the secondary sintering step is preferably performed by conducting a hot isostatic pressing (HIP) method in which the primary sintered body is further sintered at a temperature of 1600 to 1900° C. for 0.5 to 2 hours under a state where the primary sintered body is applied with pressing force of 70 MPa, preferably 100 MPa.

When the above sintering temperature at the secondary sintering step is lower than the lower limit of the above temperature range or when the pressing force is lower than the above range, or when the sintering time at the secondary sintering step is less than the lower limit of the above time range, there may be a fear that the relative density of the resulting silicon nitride sintered body (secondary sintered body) at a stage of completion of the secondary sintering step would not become high density of exceeding 98%. In addition, there may be also a fear that it becomes difficult to suppress the dispersions in Vickers hardness and the fracture toughness of the silicon nitride secondary sintered body to be within the range of ±10%.

On the other hand, when the sintering operation is performed under a condition that the secondary sintered body is further sintered at a temperature exceeding the upper limit of the above temperature range, there may be a fear that silicon nitride component is liable to be evaporated and decomposed.

Further, in a case where the sintering time at the secondary sintering step exceeds the upper limit of the above time range, there may be a fear that the relative density is not further improved and a densification effect is saturated, so that the manufacturing time (process time) is increased, thus being not preferable.

As described above, according to the method of manufacturing the wear resistant member of this invention, when using a material powder mixture containing 10 to 3500 ppm of an Fe component and 10 to 1000 ppm of a Ca component, it becomes possible to manufacture a silicon nitride sintered body (wear resistant member) in which the dispersions in hardness and the fracture toughness of the silicon nitride sintered body are suppressed to be within the range of ±10%.

Further, according to the method of manufacturing the wear resistant member of this invention, for example, there can be manufactured a silicon nitride sintered body (wear resistant member) in which a maximum longer diameter of the silicon nitride crystal grain is 40 μm or less and an average aspect ratio of 2 or more.

Furthermore, according to the method of manufacturing the wear resistant member of this invention, in a case where the wear resistant member has a plate-shape, it is possible to manufacture the plate-shaped wear resistant member having a rolling life of $2 \times 10^7$ or more, the rolling life being defined as a rotation number when the wear resistance testing apparatus shown in FIG. 1 is operated under a predetermined condition. Furthermore, in a case where the wear resistant member has a spherical shape, it is possible to manufacture the spherical-shaped wear resistant member having a rolling life of 100 hours or more, the rolling life being defined as a duration time of the spherical-shaped wear resistant member when the wear resistance testing apparatus shown in FIG. 1 is operated under a predetermined condition.

Embodiments

Next, embodiments of the present invention will be specifically explained in detail with reference to the following examples described below.

Examples 1-12 and Comparative Examples 1-4

There were prepared a plurality kinds of $Si_3N_4$ (silicon nitride) material powders that were manufactured by metal nitriding method and each of the material powders contains different amounts of Fe component and Ca component as shown in Table 1. These silicon nitride material powders were mixed with $Y_2O_3$ (yttrium oxide) powder, $Al_2O_3$ (aluminum oxide) powder, AlN (aluminum nitride) powder and $TO_2$ (titanium oxide) powder as sintering promoters (sintering agents), thereby to prepare material powder mixtures each containing Fe component and Ca component at amounts shown in Table 1.

In this regard, as the silicon nitride material powders and the sintering promoter powders each having an average grain size of 0.3 to 1.5 μm were used. Further, in the material powder mixture, the content of $Y_2O_3$ was 3 wt %, that of AlN is 3 wt %, $TiO_2$ is 1 wt %, and a balance is silicon nitride material powder.

By the way, material powders other than the silicon nitride material powder, i.e. each of $Y_2O_3$ powder, $Al_2O_3$ powder, AlN powder and $TiO_2$ powder as sintering promoters do not contain Fe component and Ca component. Therefore, each of the Fe component and the Ca component contained in the material powder mixture are resulting from Fe component and Ca component contained in the silicon nitride material powder.

Each of the material powder mixtures was wet pulverized (blended and ground) in ethyl alcohol using silicon nitride balls as a grinding medium for 48 hours and was then dried to prepare uniform material powder mixtures. Further, an organic binder was added to each of the uniform material powder mixtures thereby to prepare blended-granulated powders.

The same procedures as in Example 1 were repeated except that compositions of the silicon nitride material powder mixtures were changed as shown in Table 1, thereby to prepare other blended-granulated powders for Examples 8-12

TABLE 1

| Sample No. | Material Powder Mixture | | Content of Silicon Nitride | |
|---|---|---|---|---|
| | Fe-Content (ppm) | Ca-Content (ppm) | Material Powder | Contents of Sintering Promoter Powders |
| Example 1 | 10 | 10 | Balance | $Y_2O_3$ (3 wt %), $Al_2O_3$ (3 wt %), AlN (2 wt %), $TiO_2$ (1 wt %) |
| Example 2 | 100 | 50 | | |

TABLE 1-continued

| Sample No. | Material Powder Mixture Fe-Content (ppm) | Ca-Content (ppm) | Content of Silicon Nitride Material Powder | Contents of Sintering Promoter Powders |
|---|---|---|---|---|
| Example 3 | 1000 | 100 | | |
| Example 4 | 2000 | 500 | | |
| Example 5 | 3500 | 1000 | | |
| Example 6 | 100 | 100 | | |
| Example 7 | 200 | 100 | | |
| Example 8 | 100 | 50 | | $Y_2O_3$ (3 wt %), $Al_2O_3$ (2 wt %), AlN (2 wt %), $HfO_2$ (2 wt %), |
| Example 9 | 1000 | 100 | | |
| Example 10 | 2000 | 500 | | $Mo_2C$ (0.5 wt %), SiC (4 wt %) |
| Example 11 | 1000 | 100 | | $Y_2O_3$ (5 wt %), $Al_2O_3$ (4.5 wt %), AlN (1 wt %), $TiO_2$ (3 wt %) |
| Example 12 | 1000 | 100 | | $Y_2O_3$ (4 wt %), $Al_2O_3$ (3 wt %), AlN (1.5 wt %), $HfO_2$ (2.5 wt %), $Mo_2C$ (1.5 wt %), SiC (5.5 wt %) |
| Comparative Example 1 | 100 | 50 | | $Y_2O_3$ (3 wt %), $Al_2O_3$ (3 wt %), AlN (2 wt %), $TiO_2$ (1 wt %) |
| Comparative Example 2 | 2000 | 500 | | |
| Comparative Example 3 | 100 | 50 | | |
| Comparative Example 4 | 2000 | 500 | | |

Next, each of the blended-granulated powders was weighted so that a volume of a resultant sintered body as a final product was 4500 mm³. Then, each of the blended-granulated powders was press-molded at a molding pressure of 150 MPa thereby to prepare a plurality of molded bodies. Subsequently, these molded bodies were degreased in air-flowing atmosphere having a temperature of 450° C. for 4 hours. Thereafter, each of the degreased molded bodies was subjected to a primary sintering step in which the degreased molded body was heated up to a maximum temperature at a temperature-rising rate of 100° C./h or less shown in Table 2 in a nitrogen gas atmosphere having pressure of 0.7 MPa, and the heated molded body was held at the maximum temperature for a predetermined retention time which is set to a value shown in Table 2 thereby to form the respective primary sintered bodies.

Further, each of the primary sintered bodies was then subjected to a secondary sintering step in which the primary sintered body was heated up to a maximum temperature for a retention time that are indicated in Table 2, thereby to manufacture the respective secondary sintered bodies and to provide the respective wear resistance members composed of the secondary sintered bodies.

In this connection, above the secondary sintering step was performed as a hot isostatic pressing (HIP) method in which the primary sintered body was applied with a pressing force of 100 MPa in a nitrogen gas atmosphere.

In the above manufacturing steps, a density (relative density) of the sintered body after the primary sintering step and a density (relative density) of the sintered body after the secondary sintering step were measured. Then, with respect to the sintered body after the secondary sintering step, a grinding work was performed to control a surface roughness (Ra) to be 0.01 μm. After the grinding work, a member formed with a void having a diameter of 5 μm was deemed as a defective, a number of the defective members was measured as a defective percentage. The respective measured results are shown in Table 2 hereunder.

Whether or not the void (pore) generated in an inner portion of the sintered body is existing can be confirmed only when a surface of the sintered body is ground and observed.

In this connection, each of the density (relative density) (%) of the sintered bodies was measured as a ratio (%) of an actual density measured by Archimedes' principle with respect to a theoretical density of the silicon nitride sintered body.

TABLE 2

| Sample No. | Primary Sintering | | | | Secondary Sintering (HIP) | | | Defective Percentage after Grinding Work (%) |
|---|---|---|---|---|---|---|---|---|
| | Temperature Rising Rate from 1400° C. (° C./h) | Maximum Temperature (° C.) | Retention Time (h) | Sintered Body Density (Relative Density) (%) | Maximum Temperature (° C.) | Retention Time (h) | Sintered Body Density (Relative Density) (%) | |
| Example 1 | 20 | 1750 | 6 | 92 | 1700 | 1 | 99.96 | 0.6 |
| Example 2 | 20 | 1775 | 8 | 95 | 1700 | 2 | 99.98 | 0.5 |
| Example 3 | 15 | 1800 | 6 | 93 | 1750 | 1 | 99.95 | 0.5 |
| Example 4 | 15 | 1825 | 6 | 98 | 1800 | 1 | 99.96 | 0.6 |
| Example 5 | 10 | 1850 | 8 | 98 | 1800 | 2 | 99.99 | 0.6 |
| Example 6 | 10 | 1775 | 6 | 97 | 1750 | 1 | 99.97 | 0.5 |
| Example 7 | 10 | 1800 | 6 | 98 | 1750 | 2 | 99.98 | 0.5 |
| Example 8 | 15 | 1750 | 6 | 95 | 1700 | 1 | 99.95 | 0.6 |
| Example 9 | 10 | 1775 | 6 | 93 | 1700 | 1 | 99.97 | 0.6 |

TABLE 2-continued

|  | Primary Sintering | | | | Secondary Sintering (HIP) | | | |
| --- | --- | --- | --- | --- | --- | --- | --- | --- |
|  | Temperature | | | | | | | |
| Sample No. | Rising Rate from 1400° C. (° C./h) | Maximum Temperature (° C.) | Retention Time (h) | Sintered Body Density (Relative Density) (%) | Maximum Temperature (° C.) | Retention Time (h) | Sintered Body Density (Relative Density) (%) | Defective Percentage after Grinding Work (%) |
| Example 10 | 8 | 1800 | 6 | 92 | 1700 | 1 | 99.96 | 0.6 |
| Example 11 | 10 | 1725 | 6 | 95 | 1700 | 1 | 99.96 | 0.5 |
| Example 12 | 10 | 1725 | 6 | 95 | 1700 | 1 | 99.97 | 0.6 |
| Comparative Example 1 | 50 | 1775 | 3 | 85 | 1700 | 1 | 99.50 | 2.3 |
| Comparative Example 2 | 50 | 1825 | 4 | 78 | 1800 | 1 | 99.38 | 3.2 |
| Comparative Example 3 | 100 | 1775 | 3 | 83 | 1750 | 2 | 99.99 | 5.5 |
| Comparative Example 4 | 100 | 1825 | 6 | 75 | 1825 | 2 | 99.99 | 6.1 |

※:Defective percentage was measured as a ratio of defectives when the wear resistant members were ground to have a surface roughness (Ra) of 0.01 μm.
※:Whether or not a pore (void) is existing at inner portion of the sintered body can be confirmed when the sintered body is ground. Since this invention directs to a large-sized wear resistant member having a volume of 4000 mm3 or more, the improvement of the production yield results in a great industrial significance.

As is clear from the results shown in above Table 2, in the silicon nitride sintered bodies according to the respective Examples in which the temperature-rising rate for heating up the molded body from 1400° C. to the maximum sintering temperature in the primary sintering step was set to 20° C./h or less and the secondary sintering step was performed under the predetermined conditions, it was confirmed that a void generation was extremely few even if the silicon nitride sintered body was subjected to the grinding work whereby the defective percentage was reduced to be 1% or less.

On the other hand, the wear resistant members composed of the sintered bodies according to the respective Comparative Examples in which the temperature-rising rate for heating up the molded body in the primary sintering step was set to a value exceeding 20° C./h, a large amount of voids was generated even if the same secondary sintering step as in Examples was performed, thus resulting into an increase of the defective percentage.

Next, with respect to thus manufactured wear resistant members according to each of Examples and Comparative Examples, a Vickers hardness, a fracture toughness value, and an average value thereof, a dispersion thereof, and a rolling life were measured.

In this regard, the Vickers hardness was measured in accordance with a method prescribed in Japan Industrial Standard (JIS R1610). An average value of the Vickers hardness was obtained by averaging the measured values measured to 10 pieces of the wear resistant members of each Examples and Comparative Examples. Further, a dispersion in Vickers hardness is obtained by the following manner. Namely, among the measured 10 values, a farthest value which is most numerically deviated from the average value (a farthest value which is most apart from the average value) is defined as a "most deviated value". Then, the measured average value and the most deviated value are put into a calculation formula (3) hereunder, thereby to calculate the dispersion in Vickers hardness.

Dispersion [%]=[(Average Value− Most Deviated Value)/Average Value]×100      (3)

In addition, the fracture toughness is measured by an IF method which is prescribed in Japan Industrial Standard (JIS R 1607), thereby to calculate the fracture toughness on the basis of Niihara's equation. Further, an average value and a dispersion in fracture toughness was obtained through the same method as those of Vickers hardness.

The rolling life of each of the respective abrasion resistant members was measured by using a thrust-type rolling wear (abrasion) testing apparatus 1 as illustrated in FIG. 1. The testing apparatus 1 is configured by comprising: a plate-shaped wear (abrasion) resistant member 3 disposed in a main body 2 of the testing apparatus 1; three of rolling steel balls 4 disposed on an upper surface of the wear resistant member 3; a guide plate 5 disposed on the rolling steel balls 4; a drive shaft 6 connected to the guide plate 5; and a holder (retainer) 7 for defining the interval between the respective rolling steel balls 4. The main body 2 is filled with a lubricating oil 8 for lubricating a rolling portion.

In this measuring operation, as the plate-shaped wear (abrasion) resistant member 3 for the thrust-type rolling wear (abrasion) testing apparatus 1, a test sample which was formed by working each of the wear resistant members of Examples and Comparative Examples into a sample having dimension of 70 mm×70 mm×3 mm (thickness) was used. At this time, a surface roughness (Ra) of the plate-shaped member (wear resistant member) 3 was set to 0.01 μm. Further, as the rolling balls 4 for the thrust-type rolling wear (abrasion) testing apparatus 1, spherical balls each composed of SUJ2 and having a diameter of 9.35 mm were used.

In this thrust-type rolling wear testing apparatus, the SUJ2 rolling balls 4 were applied with a load so as to be applied with a maximum contact stress of 5.9 GPa. Under this condition, these rolling balls 4 were rotated at 1200 rpm. Then, a number of rotations, that had been occurred by the time when a surface of the plate-shaped member 3 composed of the wear resistant member was exfoliated, was measured. In this regard, the rotation number was measured by setting an upper limit to $3 \times 10^7$ as a maximum rotation number.

Further, with respect to each of the wear resistant members, porosity and a diameter of an aggregated portion of the grain boundary phase component were also measured. Table 3 shows the measured results.

TABLE 3

| Sample No. | Vickers Hardness (HV) Average | Vickers Hardness (HV) Dispersion | Fracture Toughness (Mpa·m$^{1/2}$) Average | Fracture Toughness (Mpa·m$^{1/2}$) Dispersion | Rolling Life (Plate-Shaped Member) | Porosity (%) | Aggregation Diameter of Grain Boundary Phase Component (μm) |
|---|---|---|---|---|---|---|---|
| Example 1 | 1470 | ±1% | 6.3 | ±1% | $3 \times 10^7$ Rotations | 0.1 | 5.1 |
| Example 2 | 1470 | ±3% | 6.3 | ±1% | $3 \times 10^7$ Rotations | 0.3 | 3.9 |
| Example 3 | 1460 | ±5% | 6.3 | ±3% | $3 \times 10^7$ Rotations | 0.5 | 7.3 |
| Example 4 | 1440 | ±8% | 6.2 | ±3% | $3 \times 10^7$ Rotations | 0.4 | 9.5 |
| Example 5 | 1440 | ±8% | 6.2 | ±5% | $3 \times 10^7$ Rotations | 0.8 | 12.3 |
| Example 6 | 1450 | ±2% | 6.3 | ±3% | $3 \times 10^7$ Rotations | 0.6 | 6.3 |
| Example 7 | 1450 | ±2% | 6.1 | ±6% | $3 \times 10^7$ Rotations | 0.7 | 17.4 |
| Example 8 | 1470 | ±1% | 6.3 | ±1% | $3 \times 10^7$ Rotations | 0.1 | 5.0 |
| Example 9 | 1470 | ±3% | 6.3 | ±1% | $3 \times 10^7$ Rotations | 0.3 | 4.2 |
| Example 10 | 1460 | ±5% | 6.3 | ±3% | $3 \times 10^7$ Rotations | 0.4 | 7.1 |
| Example 11 | 1460 | ±3% | 6.2 | ±3% | $3 \times 10^7$ Rotations | 0.3 | 3.8 |
| Example 12 | 1460 | ±3% | 6.3 | ±3% | $3 \times 10^7$ Rotations | 0.3 | 4.1 |
| Comparative Example 1 | 1480 | ±13% | 6.2 | ±5% | $3 \times 10^7$ Rotations | 1.2 | 21.2 |
| Comparative Example 2 | 1450 | ±16% | 6 | ±9% | $3 \times 10^7$ Rotations | 1.5 | 23.3 |
| Comparative Example 3 | 1430 | ±14% | 5.7 | ±15% | $1.5 \times 10^7$ Rotations | 1.8 | 25.6 |
| Comparative Example 4 | 1410 | ±18% | 5.5 | ±17% | $1 \times 10^7$ Rotations | 2 | 28.0 |

As is clear from the results shown in above Table 3, in the large sized wear resistant members according to the respective Examples 1-12, in which the primary sintering step was performed so as to attain a relative density of 80 to 98% and the secondary sintering step was performed so as to attain a relative density of exceeding 98%, it was confirmed that the dispersions in both Vickers hardness and fracture toughness were controlled to be within a range of ±10%.

Further, it was also confirmed that all of the rolling life of each of plate-shaped wear resistant members according to Examples 1-7 exceeded $2 \times 10^7$ and the wear resistant members were excellent in rolling life.

Next, with respect to thus manufactured wear resistant members according to each of Examples and Comparative Examples, a maximum value of longer diameter of the silicon nitride crystal grains was measured, while an average aspect ratio of the silicon nitride crystal grains was calculated.

A maximum value of the longer diameter of silicon nitride crystal grains was measured by the following manner. That is, the wear resistant member was cut. Subsequently, a unit area (100 μm×100 μm) arbitrarily selected from the cut surface was taken a photograph by means of a scanning type electron microscope (SEM) at a magnification of ×5000 or more. A silicon nitride crystal grain having a maximum longer diameter is selected within the unit area observed on the photograph, and a longer diameter of the selected silicon nitride crystal grain was measured, so that the measured longer diameter was defined as the maximum value of the longer diameter.

Further, the average aspect ratio was calculated by the following manner. Namely, with respect to all of the silicon nitride crystal grains existing within the unit area observed on the photograph, the longer diameter and shorter diameter were measured thereby to obtain an aspect ratio from the longer diameter and the shorter diameter with respect to each of the silicon nitride crystal grains. As a result, the average aspect ratio was calculated by averaging the respective aspect ratios.

Furthermore, the β-phase ratio of above the silicon nitride crystal grain was identified by mean of an X-ray diffraction (XRD) apparatus. In addition, a maximum diameter of the void, which can be observed on a ground surface of a crystal structure, was also measured. Table 4 shows the measured results.

TABLE 4

| Sample No. | Maximum Value of longer Diameter of Silicon Nitride Crystal Grain (μm) | Average Aspect Ratio | β-Phase Ratio (%) | Maximum Diameter of Void (μm) | Ratio of Columnar Grain having a Longitudinal Diameter of 3 μm or more (%) |
|---|---|---|---|---|---|
| Example 1 | 16 | 5 | 98 | 2 | 5 |
| Example 2 | 20 | 5 | 100 | 1 | 6 |
| Example 3 | 20 | 7 | 99 | 2 | 6 |
| Example 4 | 23 | 7 | 97 | 2 | 7 |
| Example 5 | 26 | 7 | 98 | 1 | 7 |
| Example 6 | 30 | 9 | 99 | 1 | 8 |
| Example 7 | 20 | 4 | 99 | 2 | 6 |
| Example 8 | 20 | 5 | 99 | 1 | 5 |
| Example 9 | 20 | 7 | 98 | 2 | 6 |
| Example 10 | 23 | 7 | 97 | 2 | 7 |
| Example 11 | 21 | 6 | 99 | 1 | 7 |
| Example 12 | 22 | 6 | 99 | 2 | 6 |

TABLE 4-continued

| Sample No. | Maximum Value of longer Diameter of Silicon Nitride Crystal Grain (μm) | Average Aspect Ratio | β-Phase Ratio (%) | Maximum Diameter of Void (μm) | Ratio of Columnar Grain having a Longitudinal Diameter of 3 μm or more (%) |
|---|---|---|---|---|---|
| Comparative Example 1 | 25 | 8 | 93 | 5 | 4 |
| Comparative Example 2 | 40 | 8 | 91 | 8 | 4 |
| Comparative Example 3 | 13 | 8 | 88 | 9 | 3 |
| Comparative Example 4 | 13 | 8 | 85 | 11 | 3 |

As is clear from the results shown in above Table 4, in the wear resistant members according to the respective Examples 1-7 in which the primary sintering step was performed so as to attain a relative density of 80 to 98% and the secondary sintering step was performed so as to attain a relative density exceeding 98%, it was confirmed that the maximum value of the longer diameter of the silicon nitride crystal grains was 40 μm or less, and any coarse silicon nitride crystal grain having a longer diameter exceeding 40 μm was not generated in a structure of the wear resistant member.

Further, in each of the wear resistant members according to the respective Examples 1-12, the average aspect ratio of the silicon nitride crystal grains were 2 or more, and it was confirmed that the wear resistant member formed a microstructure in which the columnar silicon nitride crystal grains were complicatedly entangled to each other.

Examples 13-16 and Comparative Examples 5-8

The same composition control and the manufacturing procedures as in the wear resistant members according to Example 2 and Comparative Examples 1, 3 were repeated except that the material powder mixtures were weighted so that each of the volume of the resultant sintered body before conducting a polishing work was reached to a value shown in Table 5, thereby to prepare silicon nitride sintered bodies according to Examples 13-16 and Comparative Examples 5-8 each having a large diameter. Then, a rolling ball (bearing balls) as one kind of the wear resistant member was manufactured from thus obtained respective silicon nitride sintered bodies. Thereafter, a production yield of thus obtained rolling balls as the wear resistant members was evaluated, and a rolling life of each of the rolling balls was measured.

The above production yield was evaluated in such a manner that large-sized silicon nitride sintered bodies as the wear resistant members according to each of Examples and Comparative Examples were subjected to a grinding work so as to realize a surface roughness of 0.01 μm thereby to prepare rolling balls, and the production yield was evaluated by observing a state of generating exfoliation or crack.

Namely, 3000 rolling balls were manufactured per each of Examples and Comparative Examples. In these cases, the production yield was respectively evaluated by a ratio (percentage): (%) of a number of the rolling balls each causing neither exfoliation nor crack with respect to a total number of the manufactured rolling balls.

On the other hand, the rolling life of the rolling ball as the wear resistant member was measured by using the aforementioned thrust-type rolling wear (abrasion) testing apparatus 1 shown in FIG. 1.

In this connection, in the previously mentioned method for measuring the rolling life of the plate-shaped wear resistant member, a plate-shaped member 2 shown in FIG. 1 was composed of the wear resistant member, while the rolling balls 3 were composed of SUJ2.

However, contrary to the previous case, in the present measuring method, a bearing steel plate 9 composed of SUJ2 was used as the plate member, while rolling balls 8 (surface roughness Ra of 0.01 μm) each having a diameter of 9.35 mm, that were formed by working the wear resistant members according to Examples 13-16 and Comparative Examples 5-8, were used.

In this measuring operation using the thrust-type rolling wear testing apparatus 1, the rolling balls 8 each composed of the wear resistant members were applied with a load so as to be applied with a maximum contact stress of 5.9 GPa. Under this condition, these rolling balls 8 were rotated at a rotation speed of 1200 rpm. Then, a time, that had been occurred by the time when a surface of the rolling balls 8 composed of the wear resistant member was exfoliated, was measured. In this regard, the rotation time was measured by setting an upper limit of 450 hours as a maximum rotation time (hour). Table 5 shows the measured results.

TABLE 5

| Sample No. | Composition and Manufacturing Condition of Rolling Ball | Volume of Ball (mm³) | Rolling Life of Rolling Ball (h) | Production Yield during Manufacturing Rolling Ball (%) |
|---|---|---|---|---|
| Example 13 | Example 2 | 4000 | 450 h or more | 99 |
| Example 14 | Example 2 | 15000 | 450 h or more | 97 |
| Example 15 | Example 2 | 30000 | 450 h or more | 97 |
| Example 16 | Example 2 | 70000 | 450 h or more | 96 |
| Comparative Example 5 | Comparative Example 1 | 5000 | 200 h | 94 |
| Comparative Example 6 | Comparative Example 1 | 7000 | 130-200 h | 90 |
| Comparative Example 7 | Comparative Example 3 | 5000 | 200 h | 94 |
| Comparative Example 8 | Comparative Example 3 | 7000 | 130-200 h | 80 |

As is clear from the results shown in above Table 5, in the rolling balls each composed of the wear resistant members according to the respective Examples 13-16 obtained under the same composition control and manufacturing condition as those of the wear resistant member according to Example 2, it was confirmed that the production yield during the manufacturing step (working step) was improved to be high. This reason is considered that the wear resistant members according to the respective Examples 13-16 comprise a high Vickers hardness and fracture toughness value, and the dispersions in Vickers hardness and fracture toughness are small as those of the wear resistant member according to Example 2.

On the other hand, in the rolling balls that are wear resistant members of Comparative Examples 5-8 obtained under the same composition control and manufacturing condition as those of the wear resistant members according to Comparative Examples 1, 3, the production yield during the manufacturing step (working step) is high in a case where the diameter of the rolling ball is relatively small.

However, in a case where the diameter was increased to be 20 mm or more (a volume of the rolling ball was about 4190 mm$^3$ or more), it was confirmed that the production yield during the manufacturing step (working step) was remarkably lowered.

Accordingly, it was confirmed that the wear resistant member of the present invention is suitable for a middle-sized to a large-sized rolling ball having a diameter of 20 mm or more, preferably a diameter of 25 mm or more. Further, each of the rolling ball according to Examples 13-16 exhibited a rolling life of 400 hours or more, so that it was also confirmed that the wear resistant member of the present invention has a sufficient durability under severe use conditions.

As described above, according to the present embodiments, there can be provided a wear resistant member comprising a ceramic sintered body mainly composed of silicon nitride which contains 10 to 3500 ppm of Fe component and 10 to 1000 ppm of Ca component, wherein each of dispersions in Vickers hardness and fracture toughness of an inner portion of the wear resistant member is suppressed to be within a range of ±10%, and the wear resistant member can be provided with a low cost and is excellent in reliability.

In particular, even if a large sized wear resistant member having a volume of 4000 mm$^3$ or more is formed, the dispersion in characteristics is small, so that the production yield can be greatly improved, thus being extremely remarkable industrial effect indeed. Further, according to the present embodiments, when a wear resistant device is configured by using the above wear resistant member, there can be provided a wear resistant device excellent in reliability with a low cost.

The invention claimed is:

1. A wear resistant member, comprising a silicon nitride sintered body having a volume of 4000 mm$^3$ or more, said silicon nitride sintered body comprising:
   1 to 5 mass % of a rare earth component in terms of rare earth element,
   1 to 6 mass % of an Al component in terms of Al element,
   10 to 3500 ppm of an Fe component in terms of Fe element, and
   10 to 1000 ppm of a Ca component in terms of Ca element,
   wherein a β-phase ratio of silicon nitride crystal grains is 95% or more,
   a maximum longer diameter of silicon nitride crystal grains is 40 μm or less, and
   variation in each of Vickers hardness and fracture toughness of an inner portion of the wear resistant member is within a range of ±10%, said inner portion of the wear resistant member has a fracture toughness of 5.5 MPa·m$^{1/2}$ or more,
   said inner portion of the wear resistant member has a Vickers hardness of 1380 or more,
   said silicon nitride sintered body has a porosity of 1% or less, and a maximum diameter of void is 3 μm or less,
   an average aspect ratio, which is defined as an average value of respective aspect ratios of silicon nitride crystal grains, is 2 or more, and
   said silicon nitride sintered body has a number ratio of 5% or more, when the number ratio is defined as a ratio of a number of columnar crystal grains each having a longitudinal diameter of 3 μm or more with respect to a whole number of crystal grains constituting the silicon nitride sintered body.

2. The wear resistant member according to claim 1, wherein said silicon nitride sintered body comprises 0.1 to 5 mass % of at least one element selected from the group consisting of Ti, Zr, Hf, W, Mo, Ta, Nb, and Cr.

3. The wear resistant member according to claim 1, wherein an aggregation size of a grain boundary phase component in said silicon nitride sintered body is 20 μm or less.

4. The wear resistant member according to claim 1, in the form of a part for at least one selected from the group consisting of a cutting tool, a rolling body of a bearing, a valve member, and a rolling jig.

5. The wear resistant member according to claim 1, in the form of a spherical body having a diameter of 20 mm or more.

6. The wear resistant member according to claim 1, having a surface roughness (Ra) of 0.5 μm or less.

7. The wear resistant member according to claim 5, wherein said silicon nitride sintered body has a double-ball crush strength of 100 N/mm$^2$ or more.

8. A wear resistant device, comprising a plurality of said wear resistant member according to claim 1.

9. A method of manufacturing the wear resistant member according to claim 1, the method comprising:
   (A) mixing a silicon nitride material powder containing 10 to 3500 ppm of an Fe component in terms of Fe element and 10 to 1000 ppm of a Ca component in terms of Ca element with 1 to 5 mass % of a rare earth component in terms of rare earth element and 1 to 6 mass % of an Al component in terms of Al element as sintering agent powders, to thereby prepare a material powder mixture;
   (B) molding said material powder mixture to thereby form a molded body;
   (C) sintering said molded body at a sintering temperature of 1600 to 1950° C. wherein a heating rate at a temperature range of 1400° C. to a maximum sintering temperature is 20° C./hour or less, and a retention time for holding the molded body at the maximum sintering temperature is 4 hours or more, to thereby obtain a primary sintered body having a relative density of 80 to 98%; and
   (D) further sintering said primary sintered body so that the relative density is further increased to exceed 98%.

10. The method of claim 9, wherein the further sintering (D) is performed by hot isostatic pressing (HIP) said primary sintered body such that said primary sintered body is heated to a temperature of 80% to 100% of the maximum sintering temperature set in the sintering (C).

11. The method of claim 9, wherein the sintering (C) is performed such that a heating time for heating the molded body from a temperature of 1400 ° C. to the maximum sintering temperature is 10 hours or more.

12. The method of claim 9, further comprising grinding a secondary sintered body after the further sintering (D) so that a surface roughness (Ra) of the secondary sintered body is 0.5 μm or less.

13. The wear resistant member according to claim 1, wherein said void has a maximum diameter of 1 to 2 μm.

14. The wear resistant member according to claim 1, wherein said silicon nitride crystal grain has an average aspect ratio of 10 or less.

* * * * *